No. 863,813.
PATENTED AUG. 20, 1907.
J. D. TYLER.
STRAINER.
APPLICATION FILED MAY 11, 1907.
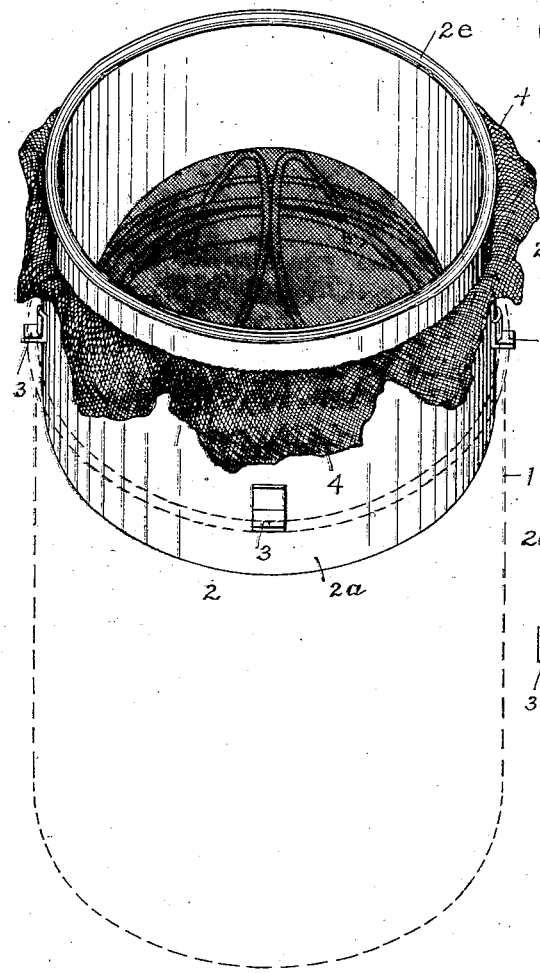
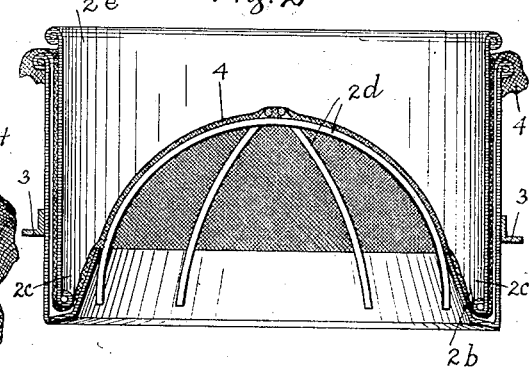
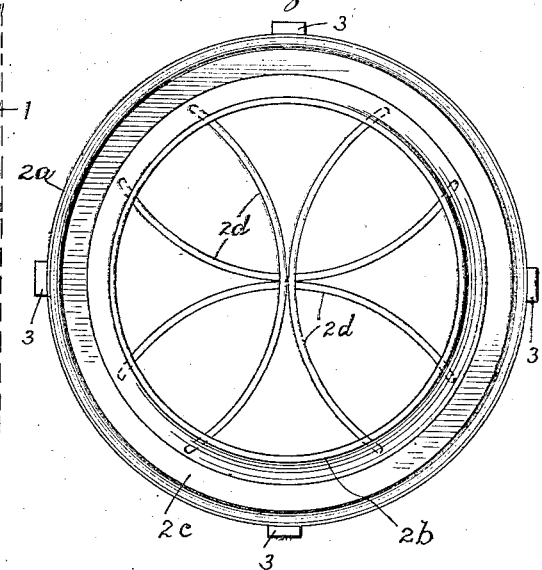
Witnesses
A. Kinsley
W. Haas.
Inventor
J. D. Tyler
By John E. Dewey,
Attorney

UNITED STATES PATENT OFFICE.

JAMES D. TYLER, OF SOUTH BERLIN, MASSACHUSETTS.

STRAINER.

No. 863,813.   Specification of Letters Patent.   Patented Aug. 20, 1907.

Application filed May 11, 1907. Serial No. 373,094.

*To all whom it may concern:*

Be it known that I, JAMES D. TYLER, a citizen of the United States, residing at South Berlin, in the county of Worcester and State of Massachusetts, have invented certain new and useful Improvements in Strainers, of which the following is a specification.

My invention relates to strainers for milk or other liquids, and the object of my invention is to provide a strainer of improved construction, adapted particularly to be used in connection with a round pail, or other receptacle for milk, with which my strainer is preferably detachably connected at the time of straining the milk.

My invention consists in certain novel features of construction of my improvements as will be hereinafter fully described.

Referring to the drawing:—Figure 1 is a perspective top view of a strainer embodying my improvements, and showing it removably supported by the upper end of a pail or receptacle, shown by broken lines. Fig. 2 is a central vertical section through the strainer shown in Fig. 1, and, Fig. 3 is a top or plan view of the strainer shown in Fig. 1, with inner cylinder and strainer cloth removed.

In the accompanying drawing, 1, shown by broken lines in Fig. 1, is a milk pail or receptacle, preferably of circular shape in its transverse diameter. One part of the strainer consists of a cylinder $2^a$, of any desired diameter, and preferably some six or eight inches high, having vertically extending sides, on the outer side of which are in this instance secured four retaining lugs or ears 3, which are adapted to extend over the upper edge of the pail or receptacle 1, to hold the strainer on the upper end of said pail.

The cylinder $2^a$ has extending around its inner edge an upwardly and inwardly extending annular rim or flange $2^b$, which is imperforated, and forms an annular imperforated trough or receptacle $2^c$, extending around the inner lower edge of the cylinder $2^a$. The inner side of said trough or receptacle $2^c$ is inclined or conical shaped, and extending up from and secured in this instance to the inner side of the annular rim or flange $2^b$, of the trough or receptacle $2^c$ are in this instance two pairs of wire rods, which cross each other intermediate their ends, and form a crown-shaped support or frame $2^d$ for the cheese cloth, or other textile fabric 4, which forms the strainer, through which the milk or other liquid passes. In connection with the cylinder $2^a$, having the imperforated annular trough $2^c$ around its lower inner edge, and the supporting frame $2^d$ thereon for the cheese cloth, or other strainer material 4, I use a second cylinder $2^e$, of a little less diameter than the cylinder $2^a$, and adapted to extend loosely within the cylinder $2^a$, with its lower edge supported at the lower end of the trough $2^c$, as shown in Fig. 2. After the cheese cloth or strainer material 4 is placed over the top of the outer cylinder $2^a$, the inner cylinder $2^e$ is placed within the upper end of the cylinder $2^a$, and acts to press down the cheese cloth, or strainer fabric 4, over the crown-shaped supporting frame $2^d$, and to force it into the annular imperforated trough $2^c$ at the lower end of the cylinder $2^a$, and hold it tightly in place over the crown-shaped frame $2^d$, leaving the free edges extending over the upper end of the cylinder $2^a$, as shown in Fig. 1. After the cylinder $2^a$ has been placed within the cylinder $2^e$, and the strainer material 4 pressed down over the crown-shaped frame $2^d$, as above described and shown in Fig. 1, the milk, or other liquid, is poured into the upper open end of the cylinder $2^e$, and passes through the strainer material 4, into the pail or receptacle 1. The dirt or other substances in the milk, as the milk is poured into the strainer, will not pass through the strainer material 4, but will be carried into the imperforated trough $2^c$ extending around the lower edge of the strainer.

When the straining process is finished, the inner cylinder $2^e$ is removed, and the strainer material 4 is also removed from the strainer, by taking hold of the free edges, which extend over the upper end of the cylinder $2^a$, leaving the accumulation of dirt, and other objectionable substances, and also a small quantity of milk, in the imperforated trough $2^c$. This is poured out of the trough by turning over the cylinder $2^a$, and the trough $2^c$ is then washed or rinsed out, and the strainer is ready for use again.

The advantages of my improvements will be readily appreciated by those skilled in the art. My strainer is of simple construction, and is adapted to be used in connection with any ordinary milk pail, or receptacle, and a large amount of milk may be strained through it at one time, without clogging or interfering with the proper operation of the strainer, as all othe dirt and other objectionable substances in the milk will pass into the imperforated trough $2^c$ at the lower end of the strainer, and there is no pressure to force them through the meshes of the strainer fabric 4, but they will remain in the trough $2^c$ during the operation of straining, and after that will be washed out and thrown away.

The edges of the strainer material 4 extending above the top of the cylinder $2^a$, and turning over the top of said cylinder, as shown in Fig. 1, prevent any possibility of the dirt or other objectionable substances in the milk getting under the edges of the strainer material, and passing into the receptacle for the milk, as would be the case if the edges of the strainer material 4 only extended into the imperforated trough 2ᵉ.

Having thus described my invention, what I claim as new and desire to secure by Letters Patent is:—

1. A strainer for milk, and other liquids, comprising an outer cylinder having an annular imperforated trough at its lower end, on the inner side thereof, the inner side of said trough being inclined or conical shaped, and a crown-shaped frame extending up from said trough, to support the material through which the milk or other liquid is strained, and said material, extending over said crown-shaped frame, with its free edges extending over the upper edge of said cylinder, and a second cylinder adapted to be detachably placed within the first mentioned cylinder, to hold the strainer material stretched over said frame and within said imperforated trough and with its free edges extending between the upper ends of said cylinders.

2. A strainer for milk and other liquids, comprising a cylinder having an imperforated trough around its lower end, on the inner side thereof, said trough having its inner side inclined or conical shaped, and a crown-shaped frame secured to the inner side of said trough and extending up therefrom, to support the strainer material, and said strainer material, adapted to extend over said crown-shaped support and into said trough, with its free edges extending over the upper edge of said cylinder, and a second cylinder adapted to be detachably placed within the first mentioned cylinder, to extend within said trough and hold the strainer material in position, with its free edges extending between the upper ends of said two cylinders.

JAMES D. TYLER.

Witnesses:
J. C. DEWEY,
M. HAAS.